United States Patent

Tohma et al.

Patent Number: 5,458,914
Date of Patent: Oct. 17, 1995

[54] METHOD FOR PRODUCING MAGNETIC RECORDING MEDIUM

[75] Inventors: Kiyokazu Tohma; Ryuji Sugita, both of Hirakata; Tatsuaki Ishida, Sakai; Yasuaki Ban, Neyagawa, all of Japan

[73] Assignee: Matsushita Electric Industrial Co., Ltd., Osaka, Japan

[21] Appl. No.: 367,996

[22] Filed: Jan. 3, 1995

Related U.S. Application Data

[62] Division of Ser. No. 215,354, Mar. 21, 1994, abandoned.

[30] Foreign Application Priority Data

Mar. 22, 1993 [JP] Japan ......................................... 5-61585
Apr. 27, 1993 [JP] Japan ......................................... 5-100936

[51] Int. Cl.⁶ ..................................................... H01F 10/02
[52] U.S. Cl. ........................... 427/132; 427/128; 427/294
[58] Field of Search ............................... 427/128, 132, 427/294; 428/694 T, 900

[56] References Cited

FOREIGN PATENT DOCUMENTS 0529673  3/1993  European Pat. Off. .
59-16144  1/1984  Japan .
2-282479  11/1990  Japan .
5-72014  10/1993  Japan .

OTHER PUBLICATIONS

Patent Abstracts of Japan, vol. 15, No. 52 (C–0803) Feb. 7, 1991.

*Primary Examiner*—Bernard Pianalto
*Attorney, Agent, or Firm*—Wenderoth, Lind & Ponack

[57] ABSTRACT

A magnetic recording medium having good high density recording characteristics is produced by forming a magnetic layer on a substrate which is traveling around a peripheral surface of a cylindrical can by an oblique vapor deposition method to form a magnetic layer comprising cobalt, an axis of easy magnetization of which inclined from a line normal to the layer plane. A residual gas pressure in an initial region of the formation of the magnetic layer is kept as low as possible, in particular, the residual gas pressure in the initial region of the formation of the magnetic layer is lower than in the other part of the production apparatus.

1 Claim, 4 Drawing Sheets

METHOD FOR PRODUCING MAGNETIC RECORDING MEDIUM

This is a Divisional application of Ser. No. 08/215,354, filed Mar. 21, 1994 and now abandoned.

BACKGROUND OF THE INVENTION

1. Field of the Invention

The present invention relates to a method and apparatus for producing a magnetic recording medium.

2. Description of the Related Art

As a recording density of a magnetic read/write equipment has been increased year by year, it is highly desired to provide a magnetic recording medium which has excellent read/write characteristics in a short wavelength range. Today, a coating type of magnetic recording medium in which magnetic powder is coated on a substrate is mainly used, and its properties are being improved to satisfy the above desire. However, the improvement of the property is nearing its limit.

One of magnetic recording media which can exceed this limit is a thin film magnetic recording medium. The thin film magnetic recording medium is produced by a vacuum deposition method, a sputtering method or a plating method and has excellent read/write characteristic in a short wavelength range. Examples of magnetic materials used in the thin film magnetic recording medium are Co, Co—Ni, Co—Ni—P, Co—O, Co—Ni—O, Co—Fe—O, Co—Ni—Fe—O, Co—Cr, Co—Ni—Cr, and the like. Among them, a layer of a partial oxide such as Co—O and Co—Ni—O are the most suitable in view of the practical application in a magnetic tape, and a deposition tape comprising a Co—Ni—O magnetic layer is practically used as a Hi-8 type video tape. Of One embodiment of the production method of a deposition tape will be explained by making reference to FIG. 1, which schematically illustrates an example of an inner structure of a continuous vacuum deposition apparatus.

Figure 1:
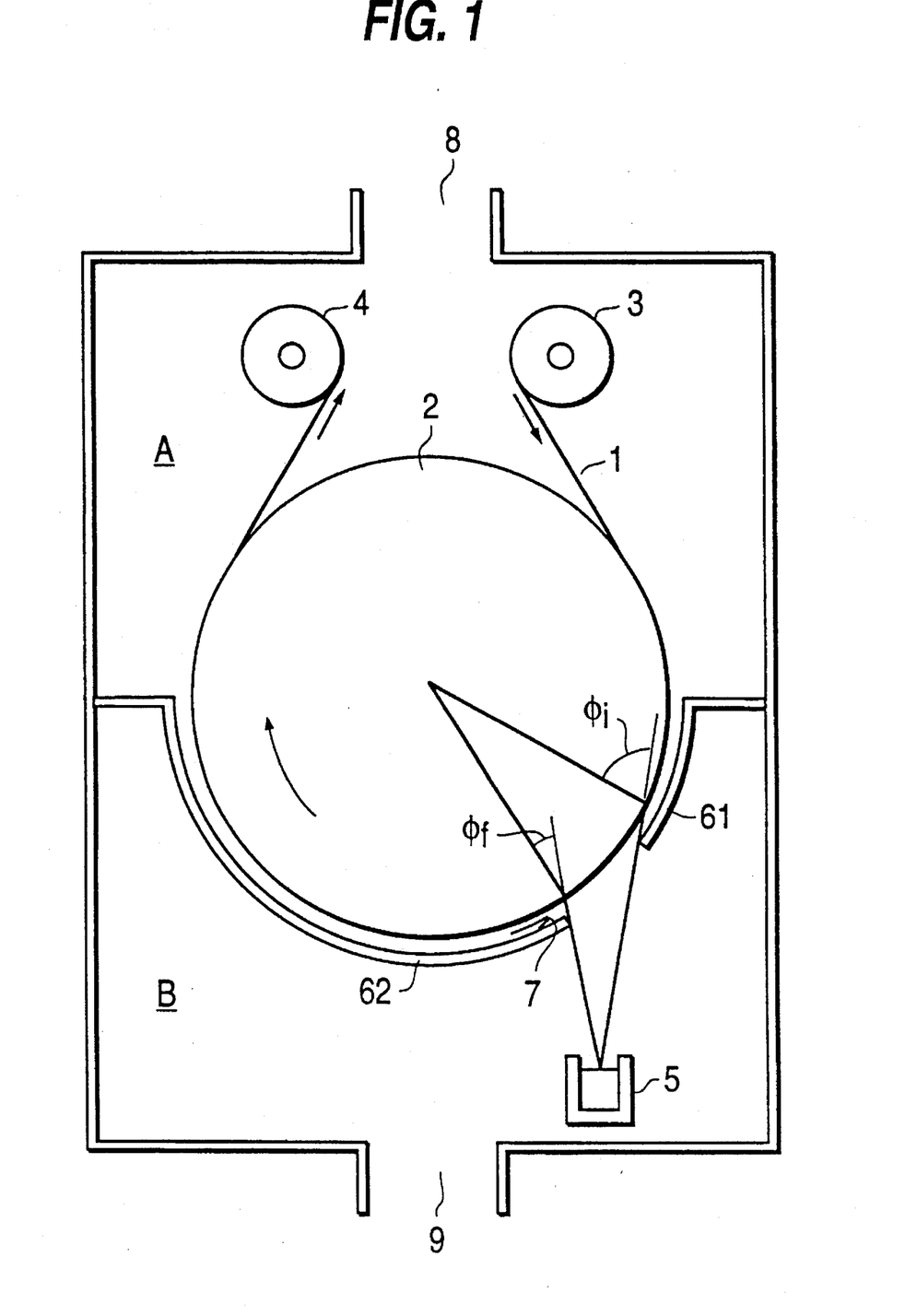
FIG. 1 schematically shows a conventional continuous vacuum deposition apparatus for producing a thin film magnetic recording medium.

A substrate 1 made of, for example, a polymer film is unwound from a supply roll 3, travels around a peripheral surface of a cylindrical drum 2 in a direction of an arrow, and is finally wound on a take-up roll 4.

A vapor of a raw magnetic material such as metal cobalt or a cobalt alloy is evaporated from an evaporation source 5 and deposited on the substrate 1 to form a magnetic layer on the substrate 1. As the evaporation source 5, an electron beam evaporation source is preferred, since it can evaporate a metal having a high melting point such as cobalt, at a high evaporation rate.

Between the evaporation source 5 and the cylindrical drum 2, there are provided two shielding plates 61 and 62, which prevent excessive deposition of the atom vapor on the substrate 1 and define a range of an incident angle of the atom vapor on the substrate 1.

The incident angle is defined as an angle between an incident direction of the atom vapor and a line normal to the substrate 1. The shielding plate 61 defines an initial incident angle $\phi_i$ of the atom vapor in relation to the substrate, while the shielding plate 62 defines a final incident angle $\phi_f$ of the atom vapor in relation to the substrate. The incident angle is one of the important factors which define the magnetic characteristics of the magnetic layer. In the practical method, the apparatus is so designed that the incident angle does not change during a long deposition period (cf. Japanese Patent KOKAI Publication No. 282479/1990).

The continuous deposition apparatus of FIG. 1 has an oxygen gas-supplying nozzle from which an oxygen gas is supplied into a vacuum chamber. The interior of the continuous deposition apparatus is divided into two sub-rooms A and B, which have exhaust outlets 8 and 9, respectively, for evacuating the respective subrooms. The outlets 8 and 9 are connected to respective evacuation pumps (not shown). The exhaust outlets may be provided on the side wall of the apparatus, and two or more exhaust outlets may be provided on each sub-room.

An atmosphere during the vapor deposition is another one of important factors which define the magnetic characteristics of the magnetic layer, and the positions of the exhaust outlets can be specially designed (cf. Japanese Patent Publication No. 72014/1993).

In the Co—O or Co—Ni—O magnetic layer formed by the above method, an axis of easy magnetization inclines at a certain angle from a normal line of the layer plane.. That is, the axis of easy magnetization is not on the normal line of the layer plane or in the layer plane but is inclined from the normal line in a plane including an incident direction of the atom vapor onto the substrate.

As explained above, the magnetic characteristics of the magnetic layer of the partial oxide are greatly influenced by the incident angle of the atom vapor on the substrate, the amount of oxygen gas to be supplied during the vapor deposition, a method for supplying the oxygen gas, and the atmosphere during the vapor deposition. Accordingly, the read/write characteristics of the magnetic recording medium are also influenced by those factors.

SUMMARY OF THE INVENTION

One object of the present invention is to provide a magnetic recording medium which has excellent high density recording characteristics.

Another object of the present invention is to provide a method for producing a magnetic recording medium which has excellent high density recording characteristics.

A further object of the present invention is to provide an apparatus which is suitable for carrying out such a method.

According to a first aspect of the present invention, there is provided a method for producing a magnetic recording medium comprising forming a magnetic layer on a substrate which is traveling around a peripheral surface of a cylindrical drum by an oblique vapor deposition method to form a magnetic layer comprising cobalt, an axis of easy magnetization of which inclines from a normal line of the layer plane, wherein a residual gas pressure in an initial region of the formation of said magnetic layer is kept as low as possible, in particular, the residual gas pressure in the initial region of the formation of said magnetic layer is lower than the other part of a production apparatus.

According to a second aspect of the present invention, there is provided a continuous vacuum deposition apparatus for producing a magnetic recording medium by forming a magnetic layer on a substrate which travels around a peripheral surface of a cylindrical drum by an oblique vapor deposition method, which apparatus comprises a vacuum vessel which is evacuated by an evacuation pump through an exhaust outlet; a cylindrical drum around a peripheral surface of which, a substrate travels; at least one shielding plate which defines an initial incident angle of an atom vapor of a magnetic metal in relation to the substrate; at least one shielding plate which defines a final incident angle of the atom vapor of the magnetic metal in relation to the substrate;

a pair of partition plates which are provided on an upstream side and downstream side, respectively of the former shielding plate along a traveling direction of said substrate to form a room surrounding said shielding plate defining the initial incident angle of the atom vapor; and an evacuation pump and an exhaust outlet which evacuate said room and are provided independently from the evacuation pump and said exhaust outlet for evacuating other parts of said vacuum vessel of said apparatus.

By the use of the independent evacuation pump and exhaust outlet, the residual gas pressure in the room defined by the substrate and the pair of partition plates is made lower than other parts of the vacuum vessel of the continuous deposition apparatus.

DETAILED DESCRIPTION OF THE PREFERRED EMBODIMENTS

The present invention will be explained in detail by making reference to the accompanying drawings.

Figure 2:
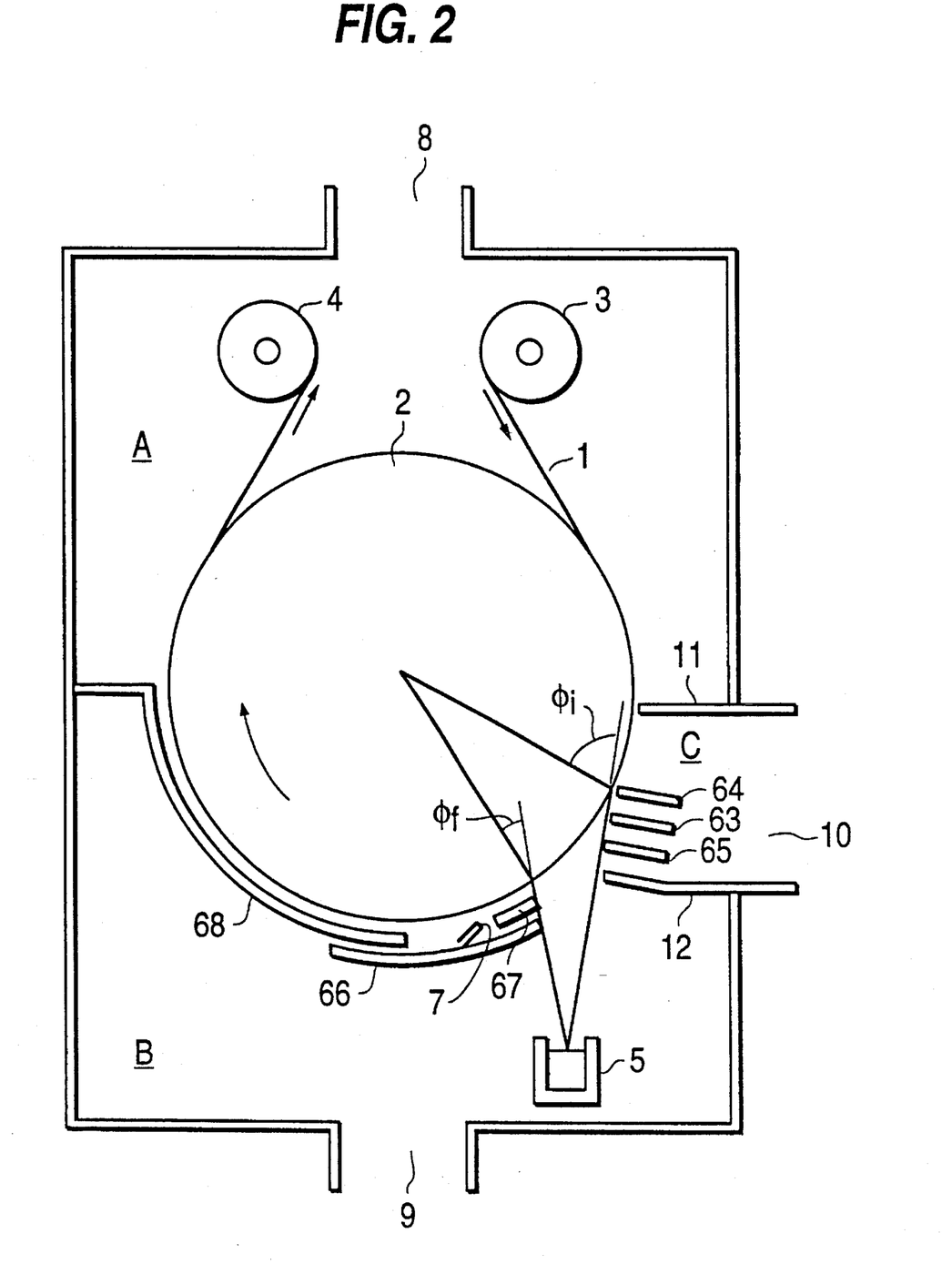
FIG. 2 schematically shows an embodiment of the vacuum deposition apparatus according to the present invention.

FIG. 2 schematically shows an embodiment of a continuous vacuum deposition apparatus for producing a thin film magnetic recording medium according to the present invention. In this apparatus, the substrate made of, for example, a polymer film (e.g. a polyethylene telephthalate film, a polyimide film, a polyamide film, a polyether imide film, polyethylene naphthalate film, etc.) is unwound from the supply roll 3, travels around a peripheral surface of the rotating cylindrical drum 2 in the direction of the arrow, and is finally wound on the take-up roll 4. While the substrate 1 travels along the peripheral surface of the cylindrical can 2, a vapor of a raw magnetic material such as metal cobalt or a cobalt alloy (e.g. Co—Ni) is evaporated from the evaporation source 5 and deposited on the substrate 1 to form a magnetic layer on the substrate 1.

The characteristics of the initial incident angle $\phi_i$ in the present invention will be explained.

The initial incident angle $\phi_i$ of the atom vapor in relation to the substrate 1 is defined by a first shielding plate. 63, which is preferably a flat plate. A second shielding plate 64, which is preferably flat, is preferably provided upstream of the first shielding plate 63 in the substrate traveling direction at a position which does not alter the initial incident angle $\phi_i$ determined by the first shielding plate 63 and which is close to the initial incident region on the peripheral surface of the cylindrical drum 2. The shielding plate may be slightly warped or slightly bent at a middle part, or of any other suitable shape.

The first shielding plate 63 defines the initial incident angle $\phi_i$ which is one of the important factors determining the magnetic characteristics of the magnetic layer, and a positional relationship between the shielding plate 63 and the cylindrical drum 2 is important. To show this importance, a relationship between the relative position of the shielding plate 63 and the cylindrical drum 2, and the magnetic characteristics of the magnetic layer was examined.

Figure 3:
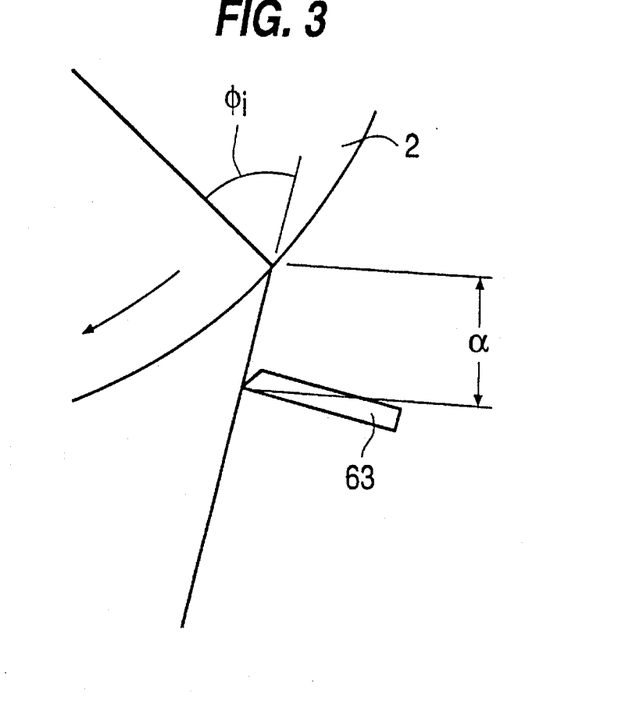
FIG. 3 is an enlarged view of an embodiment of the initial incident region of the apparatus of FIG. 2.

FIG. 3 is an enlarged view of the initial incident region of FIG. 2. A distance between the first shielding plate 63 and the cylindrical drum 2 was defined by "d" as shown in FIG. 3. In the experiments, the distance d was changed by parallel movement of the first shielding plate 63 while keeping the initial incident angle $\phi_i$ constant, and a Co—O layer having a thickness of 0.1 µm was formed on a substrate made of a polyethylene telephthalate film having a thickness of 10 µm at the initial incident angle $\phi_i$ of 70° and the final incident angle $\phi_f$ of 50°. Dependencies of a coercive force and squareness ratio of the magnetic recording media on the distance d are shown in FIG. 4.

Figure 4:
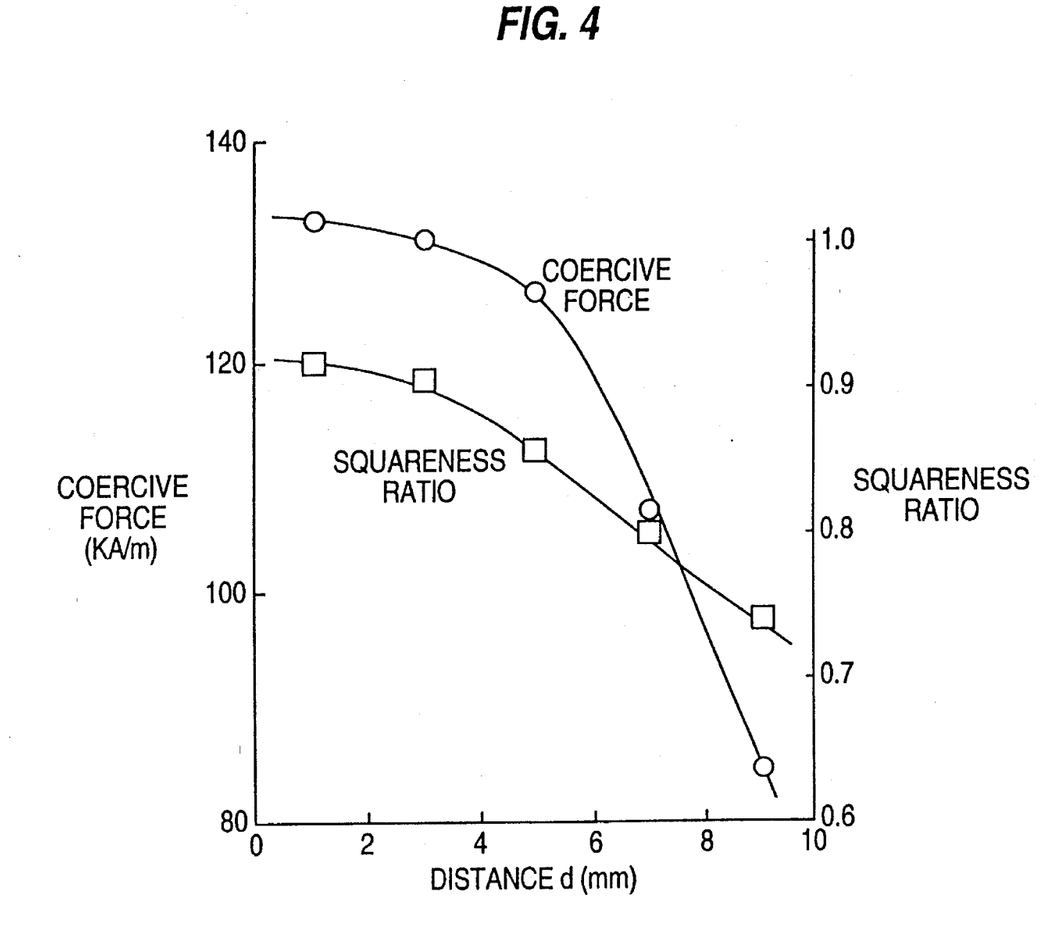
FIG. 4 is a graph showing the results of experiments.

As seen from the results of FIG. 4, as the distance d increases, the coercive force and squareness ratio decrease. A cause for these results may be scattering of the atom vapor. That is, the atom vapor which is blocked by the first shielding plate 63, includes scattered atoms impinging at a higher incident angle, the cylindrical drum 2 near where the initial incident angle $\phi_i$ is defined, so as to become deposited on the substrate. The scattered atoms which are deposited on the substrate may disturb the growth of a crystal which is to be controlled by the incident angle, so that the dispersion of magnetic anisotropy may increase.

A function of the second shielding plate 64 will be explained.

Figure 5:
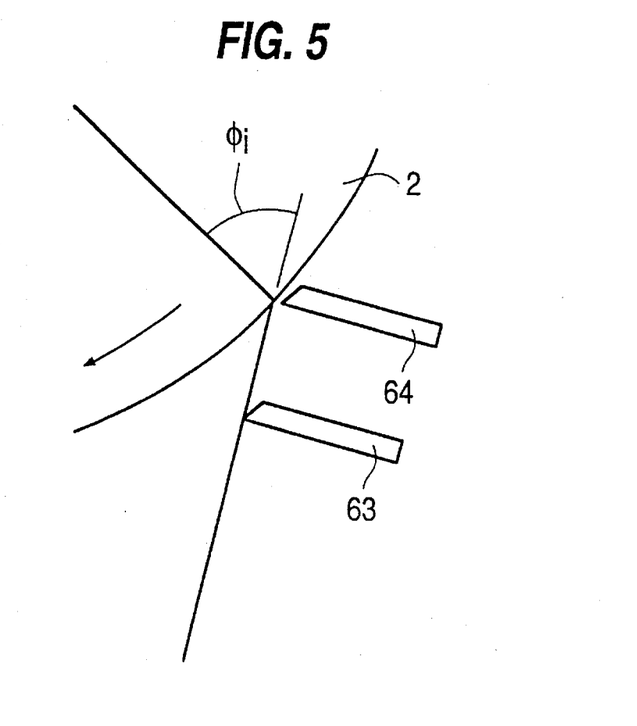
FIG. 5 is an enlarged view of another embodiment of the initial incident region of the apparatus of FIG. 2.

The second shielding plate 64 suppresses the deposition of the scattered atoms on the substrate 1. FIG. 5 is an enlarged view of the initial incident region having the second shielding plate 64 in FIG. 2. In this embodiment, the second shielding plate 64 is provided upstream side of the shielding plate 63 in the traveling direction of the substrate 1 at a closer position to the cylindrical can than the first shielding plate 63.

When the dependencies of the coercive force and squareness ratio of the magnetic recording medium on the distance d were examined while fixing the position of the second shielding plate 64 as shown in FIG. 5, the coercive force and squareness ratio were substantially constant and equal to the values of the coercive force and squareness ratio obtained at the minimum distance d in the embodiment of FIG. 4. These result support the influence of the scattered atoms on the magnetic characteristics.

However, when the distance d increases, an amount of the atoms deposited on the second shielding plate 64 quickly increases, and the deposited metal will damage the substrate 1. To prevent the damage of the substrate, it is preferable to provide an additional shielding plate between the first shielding plate 63 and the second shielding plate 64. Since the additional shielding plate shields the scattered atom vapor, it acts similar to the second shielding plate.

Now, a function of a third shielding plate 65 will be explained. In one of the preferred embodiment, the third shielding plate 65 is provided at a position between the first shielding plate 63 and the evaporation source 5, and suppresses the deposition of the evaporated atoms on the first shielding plate 63 without changing the initial incident angle $\phi_i$ defined by the first shielding plate 63. Since, among the shielding plates 63, 64 and 65, the third shielding plate 65 is closest to the evaporation source 5, it is most influenced by radiation and receives the most atoms among the shielding plates. Therefore, the third shielding plate is made of a tough material and preferably cooled with a coolant such as water. In addition, a retracting mechanism of the third shielding plate is preferably provided, so that the initial incident angle $\phi_i$ is not changed by the increase of the deposited amount of the atoms.

The characteristics of the final incident region in the present invention will be explained. Preferably, the final incident angle $\phi_f$ of the atom vapor in relation to the substrate is defined by at least two shielding plates. FIG. 2 shows an embodiment in which a pair of the shielding plates 66 and 67 are used. The shielding plate 67 suppresses the deposition of the scattered atoms on the substrate, which are not controlled by the shielding plate 66. In addition, shielding plate 66 suppresses the deposition of a large amount of evaporated atoms on the tip end of the shielding plate 67. Preferably, the shielding plate which is closest to the evaporation source, that is, the shielding plate 66 in FIG. 2, has a retracting mechanism to prevent the change of incident angle caused by the deposited metal.

A shielding plate 68 prevents the deposition of the largely scattered atom vapor on the substrate 1.

An oxygen gas-supplying nozzle 7 is positioned as shown in FIG. 2. The oxygen gas from the nozzle 7 was jetted towards the atom vapor through gaps between the shielding plates 66 and 67 and between the shielding plate 67 and the cylindrical drum 2. Each of gap distances between the shielding plates 66 and 67 and between the shielding plate 67 and the cylindrical drum 2 is preferably 2 cm or less. In particular, the gap distance between the cylindrical drum 2 and the shielding plate 67 which is closest to the cylindrical drum 2 is strictly controlled. The oxygen gas is jetted through both gaps between the shielding plates 66 and 67 and between the shielding plate 67 and the cylindrical can 2. Otherwise, the effects of the present invention may be decreased.

While a pair of the shielding plates 66 and 67 is used in FIG. 2, three or more shielding plates may be used to control the final incident angle $\phi_f$ and achieve the same effects as the pair of the shielding plates.

When three or more shielding plates are used, the oxygen gas is not necessarily blown through all the gaps between the shielding plates. The oxygen gas is blown through at least the gap which is closest to the cylindrical drum. In the apparatus of FIG. 2, although only one oxygen gas-supplying nozzle is used, a respective nozzle can be provided between the shielding plates 66 and 67 and between the shielding plate 67 and the cylindrical can 2. Since the supplied oxygen gas passes through the gaps between the shielding plates 66 and 67 and between the shielding plate 67 and the cylindrical can 2 and reaches the atom vapor, the pass from the oxygen gas-supplying nozzle to the atom vapor is sufficiently wide so that the oxygen reacts with the atoms in the vapor effectively. Accordingly, the amount of oxygen gas can be decreased. When the amount of oxygen gas is small, the gas pressure in the entire apparatus can be kept low, so that the scattering of the atoms is suppressed.

The characteristics of the continuous vacuum deposition apparatus of the present invention will be explained.

As explained above, to increase the magnetic anisotropy energy of the magnetic layer, it is important to suppress the scattering of atom vapor during the deposition of magnetic metal or alloy.

In the oblique vapor deposition method, the incident angle of the atoms is one of the important parameters. However, it is difficult to control the incident angle of the scattered atoms. When the magnetic layer contains a larger amount of the scattered atoms, the dispersion of anisotropy which is determined by the particle shape of the magnetic metal or alloy in the magnetic layer increases, so that the magnetic anisotropic energy of the magnetic layer decreases.

The main factors which scatter the atoms in the vapor include the collision of the vaporized atoms themselves and the collision of the vaporized atoms and the atoms of the residual gas. Of these two factors, the collision of the vaporized atoms and the atoms of the residual gas can be decreased.

The continuous vapor deposition apparatus is designed to decrease the amount of residual gas which causes the scattering of the atom vapor and to suppress the influence of the scattered atom vapor.

To decrease the amount of residual gas, there are two measures, one of which is the decrease of the residual gas pressure, and the other of which is the decrease of the oxygen gas to be supplied.

As shown in FIG. 2, the continuous vacuum deposition apparatus is roughly separated to form three sub-rooms A, B and C. That is, the initial incident region C of the magnetic layer, which is most severely affected by the residual gas and has the largest influence on the magnetic characteristics of the magnetic layer, is evacuated independently from the other sub-rooms A and B, whereby the residual gas pressure is decreased.

When the second and third shielding plates are used and/or when the major surface of the second and/or third shielding plate does not face the peripheral surface of the cylindrical drum, an evacuation efficiency in the initial deposition region C is improved.

Herein, the term "the major surface of the shielding plate not facing the peripheral surface of the cylindrical drum" intends to mean that the shielding plate extends substantially perpendicular to, that is, at an angle of 90°±5°, preferably 90°±2° from, the stream direction of the atom vapor. By such placing condition of the shielding plate, the evacuation efficiency near the initial incident region is improved.

As explained above, when the two or more shielding plates which define the final incident angle of the vapor deposition are used, the pass from the oxygen gas-supplying nozzle to the atom vapor is widened, and the supply efficiency of the oxygen gas is increased, so that the necessary amount of the oxygen gas is decreased and the residual gas pressure in the apparatus is lowered.

Another factor is the avoidance of the influence by the scattered atom vapor. If the atoms are assumed to proceed straight-forwardly from the evaporation source to the substrate, the shielding plate which defines the incident angle of the atom vapor in relation to the substrate may be positioned at any place between the evaporation source and the substrate. However, since the atom vapor is scattered in the actual production of the magnetic recording medium, an area of the substrate to which the atom vapor reaches is wider than when the atom vapor is assumed to proceed straight-forwardly. To the enlarged part, the scattered atoms reach. When the larger amount of the scattered atoms are deposited in the initial deposition region, the crystallinity of the magnetic layer is deteriorated, so that the magnetic characteristics and the recording and reproducing properties of the magnetic recording medium are worsened.

When the larger amount of the scattered atoms are deposited in the final deposition region, the mechanical strength of the magnetic layer tends to decrease, or the spacing in the recording and reproducing steps tends to increase.

To prevent the deposition of scattered atoms in the initial deposition region, the present invention uses one or more second shielding plates 64. To prevent the deposition of the scattered atoms in the final deposition region, the present invention uses one or more second shielding plates 67.

The above characteristics of the continuous vapor deposition apparatus of the present invention will be illustrated more in detail by making reference to the drawings.

The apparatus of FIG. 2 has the exhaust outlets 8 and 9 for evacuating the sub-rooms A and B, respectively. The outlets 8 and 9 are connected to respective evacuation pumps (not shown).

One of the differences of the apparatus of the present invention from the conventional apparatus is that the partition plates 11 and 12 are provided and separate the sub-room C including the flat shielding plates 63, 64 and 65 from other spaces of the apparatus. The sub-room C is evacuated, using an independent exhaust outlet 10 and an independent evacuation pump (not shown) independently from the other sub-rooms A and B. That is, the residual gas pressure in the sub-room C can be controlled independently from those in the sub-rooms A and B. By the partition plates 11 and 12, a differential pressure is formed between the sub-room C and the sub-rooms A and B. It is important that the partition plate 12 does not interfere with the initial incident angle $\phi_i$, and the distance between the partition plate 12 and the shielding plate 65 should be suitably adjusted. If this distance is too large, it is difficult to form the differential pressure. When this distance is too small, the vacuum becomes small so that the control of the residual gas pressure is difficult. Therefore, the distance between the partition plate 12 and the shielding plate 65 should be optimized by taking into account the capacity of the evacuation pump and the evacuation desired.

The partition plate 11 is positioned as close as possible to the cylindrical drum 2. Since FIG. 2 is a cross sectional view of the apparatus, no plate on the side of the sub-room C is shown. Of course, a front edge of the side partition plate is as close as possible to the peripheral surface of the cylindrical drum 2.

When the magnetic layer comprising Co and O (Co—O) or Co, Ni and O (Co—Ni—O) is formed using the above explained apparatus, it is preferred that a molar ratio of the oxygen gas to the atom vapor is made low. To this end, the residual gas pressure in the sub-room C is made lower than other sub-rooms A and B of the apparatus. When the residual gas pressure is decreased and, in turn, the molar ratio of the oxygen gas to the atom vapor is maintained low, the saturation magnetization of the high incident angle component in the magnetic layer formed in the initial incident region is increased. When the saturation magnetization of the high incident angle component in the magnetic layer is high, the incline anisotropy of the magnetic layer is strong, so that the formed magnetic layer has excellent read/write characteristics.

PREFERRED EMBODIMENTS OF THE INVENTION

The present invention will be explained further in detail by the following Examples.

EXAMPLE 1

Using the same continuous vapor deposition apparatus as shown in FIG. 2 except that no partition plate 11 or 12 was used, that is, no sub-room C was formed, and only one shielding plate 62 was used in the final deposition range as shown in FIG. 1, a Co—O magnetic layer was formed in the incident angle range from 70° to 50°.

In this Example, the distance d between the peripheral surface of the cylindrical can 2 and the shielding plate 63 was 10 mm (see FIG. 3). Two second shielding plates 64 were provided, one of which was positioned at the position 64 in FIG. 2 with the distance between the shielding plate and the peripheral surface of the cylindrical drum 2 being 1.5 mm. The other second shielding plate was positioned with the distance d (FIG. 3) being 4 mm.

The third shielding plate 65 was positioned about 2 cm below the first shielding plate 63.

The distance between the shielding plate on the final incident region and the peripheral surface of the cylindrical drum 2 was 1 cm.

The initial position of the shielding plate 65 was unchanged for 30 minutes from the start of the deposition, and thereafter retracted at a rate of 1 mm/hr.

As the substrate 1, a polyethylene telephthalate film having a thickness of 10 µm was used and traveled at a rate of 60 m/min. around the cylindrical can 2 having a diameter of 1 m. Metal cobalt was charged in the evaporation source 5, and molten by an electron beam of 70 kW. The oxygen gas was jetted from the nozzle 7 at a flow rate of 1.2 l/min.

Under the above conditions, the cobalt vapor was deposited on the substrate for about 3 hours with traveling the substrate 1 around the peripheral surface of the cylindrical drum 2. As a result, a magnetic layer having a thickness of 0.1 µm, substantially uniform magnetic characteristics and no flaw was formed over the elongate substrate 1.

The coercive force and squareness ratio were substantially the same as those obtained at the minimum d in FIG. 4.

After the completion of deposition of the magnetic layer, the accumulated conditions of the metal on the first and second shielding plates were observed. The thickness of the accumulated metal film was 1.5 mm in the thickest part, and no problem arose.

When the shielding plate was oriented direction substantially perpendicular to the of the atom vapor stream, the accumulated metal did not influence the incident angle even after the considerable amount of metal was accumulated on the shielding plate.

The method of the present invention is useful in the oblique deposition of the magnetic layer, and its effect is larger as the initial incident angle is larger.

EXAMPLE 2

Using the same continuous vapor deposition apparatus as shown in FIG. 2 except that no partition plate 11 or 12 was used, that is, no sub-room C was formed, and only one shielding plate 61 was used in the initial incident region as shown in FIG. 1, a Co—O magnetic layer was formed in the incident angle range from 85° to 55°.

In this Example, the distances between the shielding plates 66 and 67 and between the peripheral surface of the cylindrical drum 2 and the shielding plate 67 were 1.2 cm and 0.8 cm, respectively.

The distance between the single shielding plate 63 on the initial deposition side and the peripheral surface of the cylindrical drum 2 was 0.5 cm.

The initial position of the shielding plate 61 was unchanged for 15 minutes from the start of the deposition, and thereafter retracted at a rate of 2.5 mm/hr.

As the substrate 1, a polyethylene telephthalate film having a thickness of 10 µm was used and traveled at a rate of 50 m/min. around the cylindrical can 2 having a diameter of 1 m. Metal cobalt was charged in the evaporation source 5, and melted by an electron beam of 70 kW. The oxygen gas was jetted from the nozzle 7 at a flow rate of 0.8 l/min.

Under the above conditions, the cobalt vapor was deposited on the substrate with traveling the substrate 1 around the peripheral surface of the cylindrical drum 2 to obtain a magnetic recording medium, Sample No. (1).

For comparison, a magnetic recording medium was produced in the same manner as above except that a plate which prevented the flow of oxygen gas was provided in the gap between the shielding plates 66 and 67 and the oxygen gas was jetted from the gap between the shielding plate 67 and the peripheral surface of the cylindrical drum 2. This recording medium was designated as Sample No. (2).

A magnetic recording medium was produced in the same manner as above except that a plate which prevented the flow of oxygen gas was provided in the gap between the shielding plate 67 and the peripheral surface of the cylindrical drum 2 and the oxygen gas was jetted from the gap between the shielding plates 66 and 67. This recording medium was designated as Sample No. (3).

For further comparison, a magnetic recording medium was produced under the same conditions as above except that the apparatus of FIG. 1 was used and the distance between the shielding plate 62 and the peripheral surface of the cylindrical drum 2 was set at 1 cm, 2 cm and 4 cm for the production of magnetic recording media, Sample Nos. (4), (5) and (6), respectively.

Each of the produced magnetic recording media was slit to obtain a magnetic tape, and its read/write characteristics were evaluated using a ring-form magnetic head which is made of Sendust and has a gap length of 0.15 µm. In this evaluation, a surface of each sample tape was coated by a carbon protective film having a thickness of 10 nm. The reproducing output was produced, when the signal having a wavelength of 0.5 µm was recorded and reproduced. Also, a noise at the frequency corresponding to the wavelength of 0.6 µm when the signal having a wavelength of 0.5 µm was recorded and reproduced was measured. Both results are shown in the Table with the reproducing output and the noise of Sample No. (1) being 0 dB.

TABLE

| Sample No. | Reproducing output (dB) | Noise (dB) |
| --- | --- | --- |
| (1) | 0 | 0 |
| (2) | −1 | +1 |
| (3) | −1 | +1 |
| (4) | −1 | +1 |
| (5) | −2 | 0 |
| (6) | −3 | 0 |

As seen from the results in the Table, Sample Nos. (4), (5) and (6) produced by the conventional method had lower reproducing output than Sample No. (1) produced by the method of the present invention, and their reproducing outputs decreased as the gap distance between the shielding plate 62 and the peripheral surface of the cylindrical can 2 increased. This may be due to the accumulation of the scattered atoms.

The noise of Sample No. (4) was 1 dB higher than that of Sample No. (1) produced by the method of the present invention, while the noises Sample Nos. (5) and (6) were the same as that of Sample No. (1). The reproducing outputs of Sample No. (2) which was produced by supplying the oxygen gas through only the gap between the shielding plate 67 and the peripheral surface of the cylindrical drum 2 and the sample No. 3 which was produced by supplying the oxygen gas through only the gap between the shielding plates 66 and 67 were 1 dB higher than that of the sample No. (1).

While a pair of the shielding plates were used in the final deposition region in the above examples, it is possible to provide three or more shielding plates in the final deposition region. In such case, it is important that the oxygen gas is supplied not only through the gap between the peripheral surface of the cylindrical can and the shielding plate closest to the cylindrical can but also through at least the gap between the adjacent shielding plates closest to the cylindrical drum.

EXAMPLE 3 AND COMPARATIVE EXAMPLES 1 AND 2

Using the same continuous vapor deposition apparatus as shown in FIG. 2 except that only one shielding plate 63 was used in the initial incident region and the shielding plate 62 was used in the final incident region as in FIG. 1, a Co—O magnetic layer was formed in the incident angle range from 70° to 50°.

In this Example, the partition plate 12 was positioned so that its tip end was 5 cm below the shielding plate 63, while the partition plate 11 was positioned so that it was 15 cm above the shielding plate 63 and its tip end was 2 mm apart from the peripheral surface of the cylindrical drum 2.

The sub-room C was evacuated through the exhausting outlet 10. The pressures in the sub-rooms A, B and C were $1\times10^{-3}$ Torr., $1\times10^{-4}$ Torr, and $5\times10^{-5}$ Torr., respectively.

As the substrate 1, a polyethylene telephthalate film having a thickness of 10 µm was used and traveled at a rate of 60 m/min. around the cylindrical drum 2 having a diameter of 1 m. Metal cobalt was charged in the evaporation source 5, and melted by an electron beam of 70 kW. The oxygen gas was jetted from the nozzle 7 at a flow rate of 1.2 l/min.

The Co—O magnetic layer formed under the above conditions had the saturation magnetization of 470 emu/cc, and the anisotropic energy Ku of $2.6\times10^{6}$ erg/cc.

In Comparative Example 1, the magnetic layer was formed in the same manner as above except that the exhaust outlet 10 was closed, and the pressure in the sub-room C was $5\times10^{-4}$ Torr., while the pressures in the sub-rooms A and B were the same as above.

The formed magnetic layer had the saturation magnetization of 450 emu/cc which was very close to the saturation magnetization of the magnetic layer of Example 3 formed by the method of the present invention, while its anisotropic energy was $1.5\times10^{6}$ erg/cc. which was much lower than that of the above magnetic layer of Example 3.

In Comparative Example 2, a magnetic layer was formed using the apparatus of FIG. 1 under substantially the same conditions as above. The formed magnetic layer had the saturation magnetization of 460 emu/cc which is inbetween the two values of Example 3 and Comparative Example 1, while its anisotropic energy was $1.8\times10^{6}$ erg/cc which was close to the value of Comparative Example 1.

As seen from the above results in Example 3 and Comparative Examples 1 and 2, the evacuation of the substantially independent sub-room C increased the saturation magnetization of the formed magnetic layer, and furthermore increased the magnetic anisotropic energy greatly. This may suggest that, by the evacuation of the sub-room C, the saturation magnetization in the initially deposited part of the magnetic layer is increased, and then the initially deposited layer increased the crystalinity of the subsequently grown magnetic layer, that is, the crystal magnetic anisotropy may be increased, and then the anisotropic energy of the magnetic layer may be increased.

The read/write characteristics were evaluated. That is, a C/N ratio was measured using a commercially available Hi-8 VTR at a recording frequency of 7 MHz. In this evaluation, a surface of each sample tape was coated by a carbon protective film having a thickness of 10 nm.

In comparison with the C/N ratio of the magnetic layer formed in Comparative Example 2, that of the magnetic layer formed in Example 3 was +2 dB, while that of the magnetic layer formed in Comparative Example 1 was −1 dB.

When the continuous vapor deposition apparatus having the partition plates forming the sub-room C according to the present invention is used, the magnetic recording medium having good read/write characteristics is produced. When the sub-room C is formed but is not evacuated, the characteristics of the magnetic recording medium are worse than the conventional magnetic recording media which are produced by the method forming no sub-room C. This makes it clear that control of the residual gas pressure in the initial incident region is important.

EXAMPLE 4

Using the same continuous vapor deposition apparatus as shown in FIG. 2, a Co—O magnetic layer was formed in the incident angle range from 70° to 50°.

The distance d (see FIG. 3) between the shielding plate 63 in the initial incident region and the peripheral surface of the cylindrical drum 2 was 10 mm.

Two second shielding plates 64 were used, and the gap between the one second shielding plate 64 and the peripheral surface of the cylindrical drum 2 was 1.5 mm at the position of FIG. 5, while the distance d (see FIG. 3) between the other second shielding plate and the peripheral surface of the cylindrical drum 2 was 4 mm.

The third shielding plate 65 was positioned about 2 cm below the first shielding plate 63.

In this Example, the partition plate 12 was positioned so that its tip end was 5 cm below the shielding plate 65, while the partition plate 11 was positioned 15 cm above the shielding plate 64 which was closest to the cylindrical can and its tip end was 2 mm apart from the peripheral surface of the cylindrical drum 2.

The distances between the shielding plates 66 and 67 and between the shielding plate 67 and the peripheral surface of the cylindrical can 2 were 1.2 cm and 0.8 cm, respectively.

The initial position of the third shielding plate 65 was unchanged for 30 minutes from the start of the deposition, and thereafter regressed at a rate of 1 mm/hr, while the initial position of the shielding plate 66 in the final deposition region was unchanged for 15 minutes from the start of the deposition, and thereafter regressed at a rate of 3 mm/hr.

The oxygen gas was jetted from the nozzle 7 at a flow rate of 1.2 l/min.

The sub-room C was evacuated through the exhausting outlet 10. The pressures in the sub-rooms A, B and C were $1 \times 10^{-3}$ Torr., $8 \times 10^{-5}$ Torr, and $3 \times 10^{-5}$ Torr., respectively. The pressures in the sub-rooms B and C were lower than those in Example 3. This was because the amount of necessary oxygen gas was decreased since the oxygen gas was supplied through the plural shielding plates in the final deposition region.

As the substrate 1, a polyethylene telephthalate film having a thickness of 10 μm was used and traveled at a rate of 60 m/min. around the cylindrical can 2 having a diameter of 1 m. Metal cobalt was charged in the evaporation source 5, and melted by an electron beam of 70 kW.

Under the above conditions, the cobalt vapor was deposited on the substrate for about 3 hours with traveling the substrate 1 around the peripheral surface of the cylindrical can 2. As a result, a magnetic layer having a thickness of 0.1 μm, substantially uniform magnetic characteristics and no flaw was formed over the elongate substrate 1.

The coercive force of the magnetic layer was substantially the same as those obtained at the minimum d in FIG. 4, while the squareness ratio was 0.95.

The magnetic layer had the saturation magnetization of 480 emu/cc, and the anisotropic energy Ku of $2.7 \times 10^6$ erg/cc. Such good magnetic characteristics of the magnetic layer may be achieved by the decreased residual gas pressure near the initial incident region as described above.

The read/write characteristics of the produced magnetic recording media were evaluated in the same manner as in Example 3. The C/N at the recording frequency of 7 MHz was +3 dB in comparison with that of the magnetic layer produced in Comparative Example 1 by the conventional method.

As understood from the above explanation and results, the decrease of the residual gas pressure near the initial deposition region is very important for the improvement of the magnetic characteristics and the read/write characteristics of the magnetic layer.

In the above Examples, the residual gas pressure in the sub-room A was higher than other sub-rooms B and C. This is because such slightly higher pressure is necessary for the glow discharge treatment to remove the electric charge on the substrate 1.

For the purpose of the decrease of residual gas pressure near the initial deposition region, it is important to decrease the residual gas pressure in the sub-room A and then the gas pressure of the whole interior of the apparatus. To this end, the electric charge on the substrate 1 is preferably removed by the irradiation of ions and electron beam from an ion gun, which can be operated at a lower gas pressure. Such techniques are disclosed in U.S. Pat. No. 5,087,476, the disclosure of which is hereby incorporated by reference.

In the above four Examples, the partial cobalt oxide layer was formed, while other partial magnetic metal oxide layers can be formed by the method of the present invention with achieving the effects of the present invention.

Further, on the polymer film substrate, a non-magnetic primer layer or magnetic layer may be formed.

The incident angles $\phi_i$ and $\phi_f$ are not limited to the above used ranges. To achieve the high reproducing output, preferably the initial incident angle $\phi_i$ is larger than the final incident angle $\phi_f$, and the final incident angle $\phi_f$ is larger than 50°.

What is claimed is:

1. A method for producing a magnetic recording medium comprising: passing a substrate over the peripheral surface of a cylindrical drum supported in the housing of a production apparatus; evaporating a magnetic material containing cobalt onto the substrate at an initial region in such a manner as to form a magnetic layer comprising cobalt on the substrate, an axis of easy magnetization of which layer is oblique to a line normal to the layer; and regulating a residual gas pressure in said initial region to be lower than the pressure in the other parts of the production apparatus within the housing.

* * * * *